US011542670B2

(12) United States Patent
Frantz et al.

(10) Patent No.: US 11,542,670 B2
(45) Date of Patent: Jan. 3, 2023

(54) SYSTEM, APPARATUS, AND METHOD FOR DETERMINING DISTANCE TO A GROUND SURFACE COVERED WITH VEGETATION FOR OPERATION OF A MILLING OR RECLAMATION MACHINE

(71) Applicant: Caterpillar Paving Products, Inc., Brooklyn Park, MN (US)

(72) Inventors: Matthew-D. S. Frantz, Eden Prairie, MN (US); Garrett D. Reed, Big Lake, MN (US)

(73) Assignee: Caterpillar Paving Products Inc., Brooklyn Park, MN (US)

(*) Notice: Subject to any disclaimer, the term of this patent is extended or adjusted under 35 U.S.C. 154(b) by 0 days.

(21) Appl. No.: 17/174,366

(22) Filed: Feb. 12, 2021

(65) Prior Publication Data

US 2022/0259809 A1    Aug. 18, 2022

(51) Int. Cl.
  E01C 23/088    (2006.01)
  E01C 23/01     (2006.01)
  G01B 17/00     (2006.01)
  E02F 3/26      (2006.01)
  G01S 7/539     (2006.01)

(52) U.S. Cl.
  CPC ............ *E01C 23/088* (2013.01); *E01C 23/01* (2013.01); *E02F 3/26* (2013.01); *G01B 17/00* (2013.01); *G01S 7/539* (2013.01)

(58) Field of Classification Search
  CPC ...... E01C 23/088; E01C 23/01; E01C 19/006; G01B 17/00; G01S 7/539
  See application file for complete search history.

(56) References Cited

U.S. PATENT DOCUMENTS

| 4,573,124 A | * | 2/1986 | Seiferling | A01D 41/141 56/DIG. 15 |
| 4,910,717 A | * | 3/1990 | Terry | G01S 7/52006 D10/70 |
| 5,060,205 A | | 10/1991 | Phelan | |
| 5,309,407 A | | 5/1994 | Sehr et al. | |
| 8,843,283 B2 | | 9/2014 | Strelioff et al. | |
| 9,938,674 B2 | | 4/2018 | Engelmann et al. | |
| 9,957,675 B2 | | 5/2018 | Marsolek et al. | |
| 2013/0128279 A1 | * | 5/2013 | Wachsmann | E01C 23/088 356/601 |
| 2017/0052148 A1 | * | 2/2017 | Estevez | G01N 29/12 |
| 2019/0361117 A1 | * | 11/2019 | Estevez | G01S 15/582 |
| 2020/0088509 A1 | * | 3/2020 | Reusch | G01B 5/0035 |
| 2020/0095738 A1 | | 3/2020 | Sturos | |
| 2020/0362522 A1 | * | 11/2020 | Buschmann | E01C 19/185 |

FOREIGN PATENT DOCUMENTS

| AU | 2019201425 A1 | 2/2019 |
| DE | 102005051407 A1 | 5/2007 |

* cited by examiner

*Primary Examiner* — Carib A Oquendo
(74) *Attorney, Agent, or Firm* — Xsensus, L.L.P.; Patrick L. Miller

(57) ABSTRACT

A system, apparatus, and method can tune a sensor to filter unwanted reflections or echoes of sound waves from a vegetation layer covering a ground surface in favor of reflections or echoes of sound waves from the ground surface. Such tuning can include adjusting a width of the sound waves output by the sensor. A distance from the sensor to the ground surface underlying the vegetation layer can be determined using the reflections or echoes of the sound from the ground surface based on the sound waves output from the sensor at the adjusted width.

20 Claims, 4 Drawing Sheets

SYSTEM, APPARATUS, AND METHOD FOR DETERMINING DISTANCE TO A GROUND SURFACE COVERED WITH VEGETATION FOR OPERATION OF A MILLING OR RECLAMATION MACHINE

TECHNICAL FIELD

Embodiments of the disclosed subject matter relate to systems, apparatuses, and methods for determining distance to a ground surface covered with vegetation, particularly such systems, apparatuses, and methods as they pertain milling or reclamation machines.

BACKGROUND

Road milling and road reclamation equipment are often used along ground surfaces (e.g., roads, fields, etc.) that are covered (partially or fully) in vegetation. Operators may need to accurately measure the distance to the ground surface to ensure cutting is performed at the correct depth. However, the vegetation may cause interference with signals from a distance sensor trying to reach the ground surface. Such interference may lead to inaccurate distance measurements for the ground surface or even an inability to obtain a ground surface distance measurement.

U.S. Pat. No. 5,060,205 ("the '205 patent") describes a distance measuring system that includes an ultrasonic transducer, a transceiver, and a micro-controller-based signal processing unit. The '205 patent describes that a near-distance value is derived from a leading-edge time of a first echo which exceeds a minimum amplitude and a far distance value is determined as the trailing-edge time of the last echo signal which has an amplitude that exceeds a certain value. According to the '205 patent, multiple echo time and amplitude values are derived from the maximum amplitude echo and these values are used to prevent echoes which occur after the multiple echo time with less than a certain amplitude from being used in the determination of the far distance value. The '205 patent also describes that the far distance value represents the distance to ground and weaker, earlier echoes from trash or crop and later, multiple echoes may be ignored. However, at the very least the '205 patent is not understood to describe modifying an output pattern of waves output by the distance measuring system to determine distance to the ground.

SUMMARY

According to an aspect of the present disclosure a method is disclosed or implemented. The method, which can be performed based on a non-transitory computer-readable storage medium having stored thereon instructions that, when executed by one or more processors, cause the one or more processors to perform the method, can comprise: tuning an ultrasonic sensor to filter unwanted reflections from a vegetation layer covering a ground surface in favor of reflections from the ground surface, said tuning including adjusting a width of ultrasonic waves output by the ultrasonic sensor; and determining a distance from the ultrasonic sensor to the ground surface underlying the vegetation layer using the reflections of the ultrasonic waves output from the ultrasonic sensor at the adjusted width.

In another aspect, a method regarding a milling or reclamation machine adapted to operate over a ground surface at least partially covered with a vegetation layer is disclosed or implemented. The machine can have a sonic sensor to output sonic waves in a cone pattern downward toward a portion of the ground surface that is covered with the vegetation layer and receive corresponding reflections of the sonic waves reflected from the portion of the ground surface and the vegetation layer. The method can comprise: reducing, under control of processing circuitry, a width of the cone pattern of the sonic waves output from the sonic sensor until reflections of the sonic waves sensed by the sonic sensor are determined to be from the ground surface, the determination that the reflected sonic waves are from the ground surface including comparing respective amplitude values associated with the sensed sonic waves and selecting a highest amplitude value as corresponding to the ground surface; and determining, using the processing circuitry, a distance from the sonic sensor to the portion of the ground surface underlying the vegetation layer using the reflections of the sonic waves having the highest amplitude value and not reflections of sonic waves at lower amplitude values.

And in another aspect a milling or reclamation machine adapted to operate over a ground surface at least partially covered with a vegetation layer is disclosed or provided. The machine can comprise: a frame; a cutting system mounted to the frame, the cutting system including a rotational cutting tool to cut into the ground surface; a plurality of adjustable-parameter ultrasonic sensors mounted on the machine, each of the adjustable-parameter ultrasonic sensors being configured to output ultrasonic waves in a cone pattern downward toward a portion of the ground surface that is covered with the vegetation layer and receive corresponding echoes of the ultrasonic waves reflected from the portion of the ground surface and the vegetation layer; and a controller operatively coupled to the plurality of adjustable-parameter ultrasonic sensors and the cutting system. The controller can be configured to perform closed-loop control, for each of the adjustable-parameter ultrasonic sensors, that includes reducing a width of the cone pattern of the ultrasonic waves from an initial width to a final width at which a strongest echo of the received echoes is repeatedly identified according to at least one predetermined criterion by the controller based on analysis of voltage amplitudes corresponding to respective strengths of the received echoes, and determine, for each of the plurality of adjustable-parameter ultrasonic sensors having the width of the cone pattern set to the final width, a distance from the adjustable-parameter ultrasonic sensor to the portion of the ground surface underlying the vegetation layer based on the strongest echoes and not other echoes of lesser strength.

Other features and aspects of this disclosure will be apparent from the following description and the accompanying drawings.

DETAILED DESCRIPTION

Embodiments of the disclosed subject matter relate to systems, apparatuses, and methods for determining distance to a ground surface covered with vegetation, particularly such systems, apparatuses, and methods as they pertain to a milling or reclamation machine.

Milling or reclamation machines according to embodiments of the disclosed subject matter can include cold planers, road mills, scarifiers, rotary mixers, etc. Embodiments of the disclosed subject matter, however, are not limited to milling or reclamation machines, and may include other working (e.g., construction, mining, etc.) machines that may need to gain distance to ground information for a ground surface covered (fully or partially) with vegetation or a similar intervening surface layer.

Figure 1:
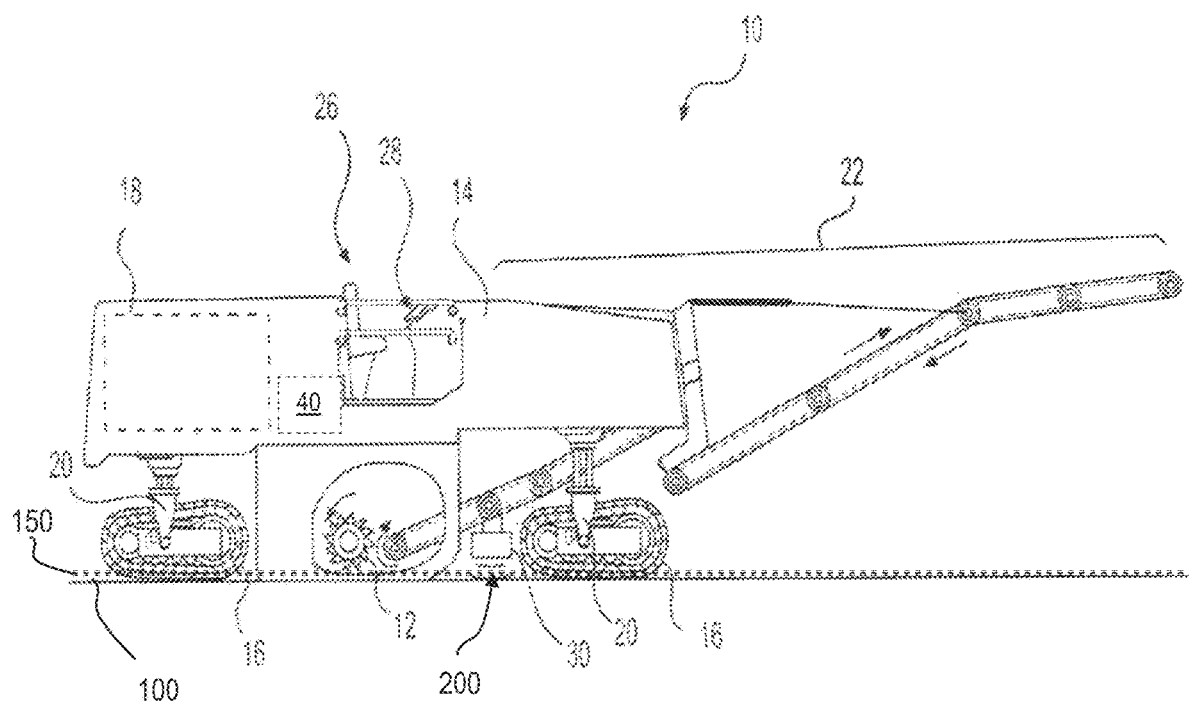
FIG. 1 is a diagram of a working machine according to one or more embodiments of the disclosed subject matter.

FIG. 1 illustrates an exemplary working machine, particularly a cold planer 10, according to embodiments of the disclosed subject matter. The cold planer 10 can be comprised of a frame 14 supported by traction devices 16, a cutting system having a cutting tool 12 (e.g., a milling drum) rotationally supported under the frame 14, and an engine 18 mounted to the frame 14 and configured to drive the cutting tool 12 and/or the traction devices 16.

Traction devices 16 may include either wheels or tracks connected to actuators 20 that are adapted to controllably raise and lower the frame 14 relative to a ground surface 100. The ground surface 100 may be referred to or characterized as a reference surface or plane. In some embodiments, the same or different actuators 20 may also be used to steer the cold planer 10 and/or to adjust a travel speed of the traction devices 16 (e.g., to speed up or brake traction devices 16), if desired. It should be noted that raising and lowering of frame 14 may also function to vary a cutting depth of cutting tool 12 into the ground surface 100. The height of the cutting tool 12 and hence the cutting depth of the cutting tool 12 may also be controlled independent of the height of the frame 14 via respective one or more actuators operatively coupled to the cutting tool 12 to raise and lower the cutting tool 12. A conveyor system 22 may be connected at a leading end to the frame 14 and configured to transport material away from the cutting tool 12 and into a receptacle, such as a waiting haul vehicle.

Figure 2:
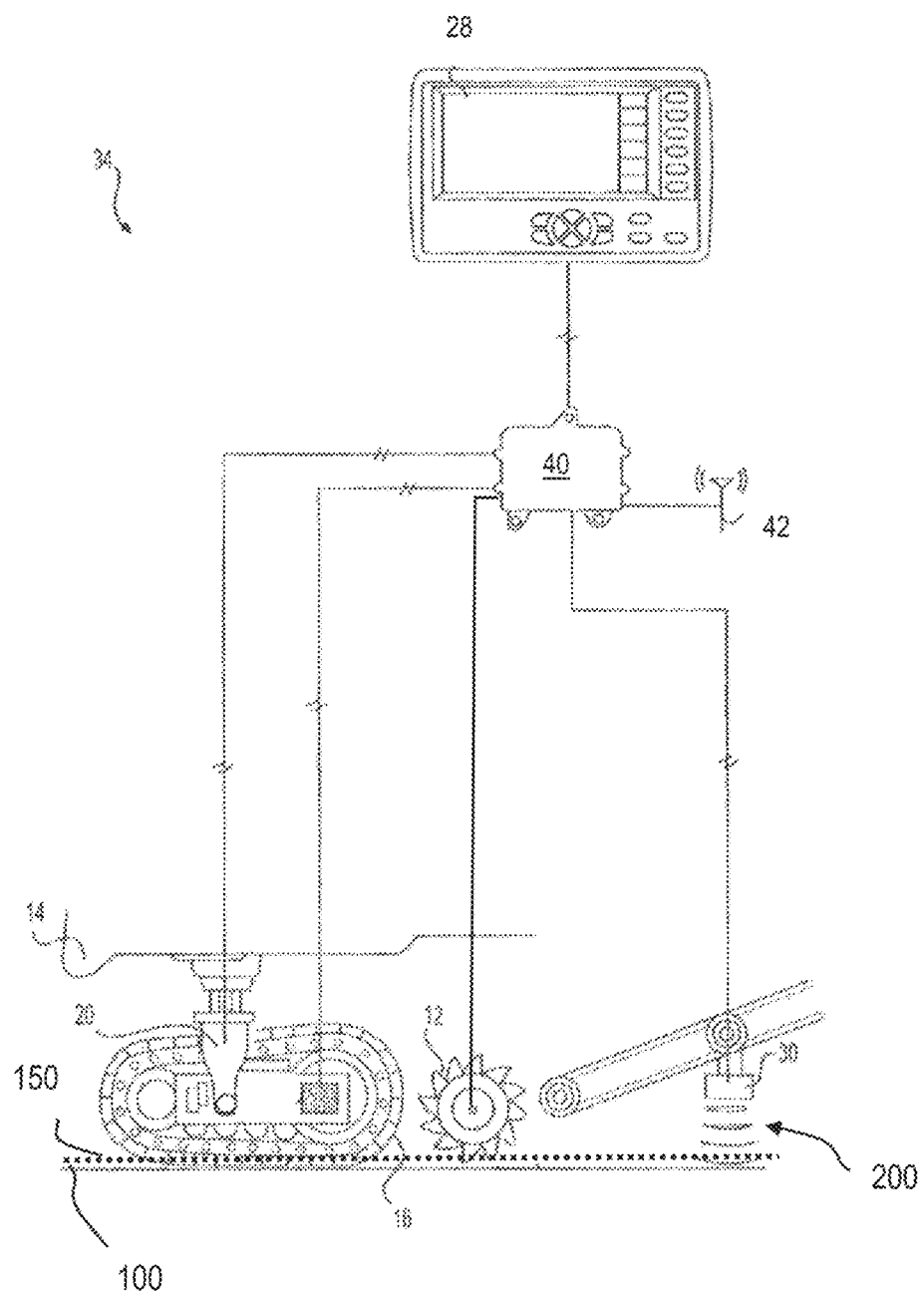
FIG. 2 is a diagram of a control system of the working machine of FIG. 1 according to one or more embodiments of the disclosed subject matter.

Frame 14 may also support an operator station 26. Operator station 26 may house any number of operator interface devices 28 used to control the cold planer 10. Operator interface devices 28 can include, among other things, one or more displays, gauges, control panels, control input devices (e.g., steering control device, throttle control, braking control, conveyor system control, cutting system control, etc.), etc. to control the cold planer 10 and specific systems thereof. FIG. 2 shows an example of an operator interface device 28 according to one or more embodiments of the disclosed subject matter. Additionally or alternatively, some or all of the operator station 26 or functions thereof can be offboard the cold planer 10. Optionally, according to one or more embodiments, the cold planer 10 may be autonomous or semi-autonomous.

The cold planer 10 can also have one or more distance sensors 30 and a controller 40. The controller 40 can be operatively coupled to the actuators 20, the traction devices 16, and the cutting system to control the actuators 20, the traction devices 16, and the cutting system, respectively. As noted above, the height of the frame 14 can be controlled via the actuators 20 under control of the controller 40, the speed and/or direction of movement for the traction devices 16 can be controlled by the controller 40, and the height of the cutting system (e.g., the cutting height of the cutting tool 12) can be controlled by the controller 40.

The controller 40 can also be operatively coupled to each of the one or more distance sensors 30. In this regard, each distance sensor 30 can send distance-related signals to the controller 40. Discussed in more detail below, such distance-related signals can correspond to strength of reflected signals output and sensed by the distance sensor 30 relative to a ground surface 100 and overlaying vegetation layer 150. Also discussed in more detail below, the controller 40 can adjust at least one parameter of the distance sensor 30 based on feedback from the distance sensor 30. The signals between the controller 40 and the distance sensor 30 can be communicated wired and/or wirelessly, for instance, via wireless communication interface 42.

The controller 40, which may be referred to or characterized as an electronic control module or unit (ECM/ECU), can include a processor or processors (e.g., microprocessor(s)) for executing specified programs that can control and/or monitor various functions associated with operation of the cold planer 10 or systems thereof, such as the cutting system (e.g., height of the cutting tool 12), the traction devices 16 (e.g., actuators 20 thereof to adjust height(s) of the cold planer 10), and the one or more distance sensors 30. The controller 40 may include a memory, such as a read only memory (ROM) that may store a program or several programs, as well as a random access memory (RAM) that may serve as a working memory area for use in executing the program(s) stored in the memory. The controller 40 may also have or otherwise be operatively connected to input/output interfaces (e.g., software-implemented logic or input/output circuitry, such as an output driver) to receive signals from and/or send signals to various components of the cold planer 10. As noted above, the controller 40 can control and/or monitor various functions associated with operation of the cold planer 10 or systems thereof, such as the cutting system (e.g., height of the cutting tool 12), the traction devices 16 (e.g., actuators 20 thereof to adjust height(s) of the cold planer 10), and the one or more distance sensors 30.

The controller 40, or portions thereof (e.g., a processor), can be implemented using circuitry. As used herein, the term "circuitry" can refer to any or all of the following: (a) hardware-only circuit implementations (such as implementations in only analog and/or digital circuitry); (b) to combinations of circuits and software (and/or firmware), such as (as applicable): (i) a combination of processor(s) or (ii) portions of processor(s)/software (including digital signal processor(s)), software and memory(ies) that work together to cause an apparatus to perform various functions); and (c) to circuits, such as a microprocessor(s) or a portion of a microprocessor(s), that require software or firmware for operation, even if the software or firmware is not physically present.

Each distance sensor 30 can be mounted on the cold planer 10, for instance, to the frame 14 or a portion of the conveyor system 22. FIG. 1 and FIG. 2, for instance, show the distance sensor 30 mounted to a conveyor portion of the conveyor system 22, in front of the cutting tool 12, however, embodiments of the disclosed subject matter are not so limited, and the distance sensor 30 may be provided additionally or alternatively rear of the cutting tool 12. According to one or more embodiments, multiple distance sensors 30 can be implemented, for instance, one distance sensor 30 mounted on a left side of the frame 14 of the cold planer 10 and another distance sensor 30 may be mounted on a right side of the frame 14 of the cold planer 10 (and optionally, yet another distance sensor 30 may be mounted between the distance sensors 30 on the left and right sides of the frame 14 of the cold planer 10).

In any case, each of the one or more distance sensors 30 can be used to determine a distance to the ground surface 100. Hence, the distance sensor 30 can be oriented downward toward the ground surface 100, for instance, either directly vertically or substantially vertically (i.e., greater y-axis direction than x-axis direction). In this regard, each of the one or more distance sensors 30 can output distance measuring signals toward the ground surface 100 and receive reflected signals from the ground surface 100 (and an overlaying interfering layer, such as the vegetation layer 150, if present). According to embodiments of the disclosed subject matter, the distance sensor 30 can output sound waves 200 and receive corresponding sound waves or echoes reflected from the ground surface 100 (and the overlaying vegetation layer 150). Hence, the distance sensor 30 can be or characterized as a sonic or ultrasonic sensor 30 and output corresponding sonic/ultrasonic waves 200 toward the ground surface 100 and receive reflected waves from the ground surface 100 (and the vegetation layer 150).

Figure 3:
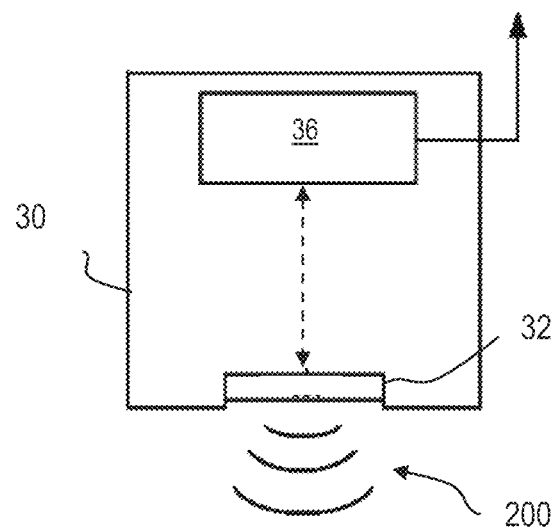
FIG. 3 is a block diagram of a distance sensor according to one or more embodiments of the disclosed subject matter.

FIG. 3 is a block diagram of an exemplary distance sensor 30 according to one or more embodiments of the disclosed subject matter. The distance sensor 30 can have a transceiver 32 and a processor 36 operatively coupled to each other. Generally, the transceiver 32, which can have a sensing element, can transmit the sound waves 200 from the distance sensor 30 and receive sound waves reflected from the ground surface 100 and/or the vegetation layer 150. Signals based on the reflected sound waves received at the transceiver 32 can be sent to the processor 36 for processing. Such processing may include converting echo or reflection strength signals (e.g., amplitude signals) from the sensing element of the transceiver 32 into corresponding voltage strength signals (e.g., voltage amplitude signals) and sending such converted signals to the controller 40 for further processing.

The controller 40 may also send control signals to the processor 36, to control operation of the distance sensor 30. For instance, each of the one or more distance sensors 30 can be controlled such that a parameter thereof is adjustable. The distance sensor 30, therefore, can be characterized as an adjustable-parameter distance sensor 30.

Figure 4:
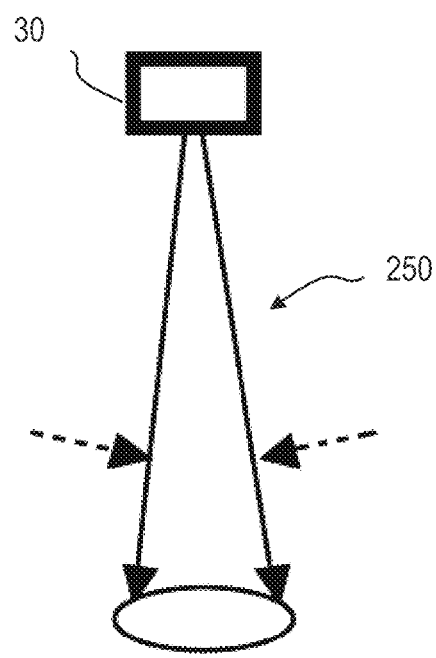
FIG. 4 is a diagram of an exemplary cone output pattern for a distance sensor according to one or more embodiments of the disclosed subject matter.

According to one or more embodiments, the distance sensor 30 can output sound waves in a cone pattern 250, such as shown in FIG. 4. Alternatively, the cone pattern can have an oval or square base. Notably, the width of the cone pattern 250 can be adjusted, using the processor 36 under control of the controller 40, for instance, depending upon the characteristics of the underlying ground surface 100, particularly whether the vegetation layer 150 is provided thereover or not. In this regard, the ground surface 100 and the vegetation layer 150 can produce sound wave reflections or echoes having different characteristics. For instance, sound waves output from the distance sensor 30 can be reflected more strongly from the ground surface 100 than sound waves from the vegetation layer 150. That is, sound waves reflected from the ground surface 100 can be greater in strength than sound waves reflected from the vegetation layer 150. Hence, the amplitude of sound waves received by the distance sensor 30 from the ground surface 100 can be greater than the amplitude(s) of sound waves received by the distance sensor 30 from the vegetation layer 150.

The width of the cone pattern 250 can be adjusted from an initial width to a final width at which the cone pattern 250 can be set for further operations such as determining distance to the ground surface 100 at the set-width cone pattern 250 (discussed in more detail below). Such adjustment can be referred to as tuning or calibrating the distance sensor 30. Thus, the control system can monitor the current adjustment state and the data received at the distance sensor 30 and adjust the cone pattern 250 of the sound waves being output by the distance sensor 30 to improve the measurement performance of the distance sensor 30 to more reliably obtain sound wave reflections from the ground surface 100 and hence be able to identify the received sound waves as such.

For instance, as represented by the two dashed arrows in FIG. 4 the width of the cone pattern 250 can be decreased from the initial width to the final width. Optionally, the width of the cone pattern 250 may be controlled so as to continually decrease (i.e., not increase at any time) from the initial width to the final width. Such control may relatively quickly achieve the final width for the cone pattern 250. Alternatively, the width of the cone pattern 250 from the initial width to the final width may oscillate about and eventually converge at the final width. Such control can relatively accurately identify reflections from the ground surface 100 rather than the vegetation layer 150.

According to one or more embodiments, the width of the cone pattern 250 can be adjusted uniformly, for instance, evenly or by equal amounts on all sides. Alternatively, the width of the cone pattern 250 can be adjusted nonuniformly, for instance, only on opposite sides or more rapidly on opposite sites. Thus, in one or more embodiments the decreasing of the width of the cone pattern 250 may change the geometric shape of the base thereof, for instance, from a circle to an oval (or some other geometric shape).

Optionally, one or more parameters of the distance sensor 30 may be constant or not adjusted, at least when adjusting the width of the cone pattern 250 of the sound waves output from the distance sensor 30. For instance, one or more of the cone length, wave strength, wave direction, cone direction, and/or orientation of the distance sensor 30 may remain unchanged or constant, at least when adjusting the width of the cone pattern 250 of the sound waves output from the distance sensor 30.

The aforementioned final width can be a width at which the reflections of the sound waves sensed by the distance sensor 30 are determined to be from the ground surface 100. That is, embodiments of the disclosed subject matter can tune or calibrate the width of the cone pattern 250 of the sound waves output from the distance sensor 30 to reduce interference (e.g., noise) caused by reflections from the vegetation (and/or other intervening objections) and reliably receive reflections from the ground surface 100. Such tuning or calibrating can involve adjusting sensitivity of the distance sensor 30.

Embodiments of the disclosed subject matter can implement closed-loop control to control the width of the cone pattern 250 from the initial width to the final width. Here, as noted above, the controller 40 can receive from the distance sensor 30 signals corresponding to the reflections and control the width of the cone pattern 250 based on analysis of the received signals. According to one or more embodiments of the disclosed subject matter regarding the closed loop control, the signals from the distance sensor 30 can be processed until a strongest echo of the incoming sound waves at the distance sensor 30 is identified according to one or more predetermined criterions. Generally, such processing can involve comparing respective strength values (e.g., amplitude values) associated with the sensed reflections and selecting a highest amplitude as corresponding to a reflection from the ground surface 100. For instance, according to one or more embodiments, the distance sensor 30 can transform strength signals corresponding to the incoming reflected sound waves into voltage signals corresponding to the strengths (e.g., amplitudes) of the reflections received at the distance sensor 30 and send such voltage signals to the controller 40 to determine which (if any) of the voltage signals correspond to reflections from the ground surface 100. Optionally, the echo or echoes corresponding to the ground surface 100 (e.g., strongest echo(es)) can be identified according to one or more predetermined criterions.

For example, the controller 40 can compare voltage amplitudes of the voltage signals corresponding to the amplitudes of the reflections received by the distance sensor 30 and select the highest voltage amplitude as corresponding to reflections from the ground surface 100. Hence, one criterion analyzed for the controller 40 to determine whether the highest voltage amplitude corresponds to the reflections of the ground surface 100 can be whether the highest voltage amplitude is above a predetermined threshold. If so, this can mean that the reflections received by the distance sensor 30 correspond to the ground surface 100, otherwise the reflections correspond to the vegetation layer 150. As an additional or alternative criterion, the highest voltage amplitude can be determined to correspond to reflections from the ground surface 100 (and not the vegetation layer 150) when the amplitude of the highest voltage is greater than the amplitude of the next highest voltage by a predetermined amount. That is, the comparison of the voltage amplitudes can identify that one of the amplitudes corresponds to the ground surface 100 when a difference between the greatest amplitude and one or more other of the voltage amplitudes exceeds a predetermined amount. This comparison may be made in addition to comparing whether the highest voltage amplitude exceeds the predetermined threshold noted above.

Additional or alternative criterion can include a ratio of relatively strong to relative weak signals (e.g., a relatively strong signal versus a predetermined number or less of relatively weak signals), a plurality of successive same strong signals without an omission over a corresponding plurality of transmitted sound waves, and/or a plurality of same strong signals within a predetermined time period. Optionally, such criterion may not include relative time between the relatively strong and weak signals. An exemplary embodiment can adjust (e.g., reduce) the width of the cone pattern 250 while monitoring up to five reflected echoes and their respective voltages (amplitudes), though embodiments of the disclosed subject matter are not so limited. This embodiment can allow up to five reflected echoes, for instance, if any or all of the echoes meet a minimum voltage threshold (or amplitude) level for measurement. Embodiments of the disclosed subject matter can thus exhibit inherent flexibility to receive and process, as an example, from one to five echoes during normal operation.

Thus, according to one or more embodiments, a signal corresponding to reflections from the ground surface 100 can be identified according to one or more predetermined criteria such as those discussed above. Moreover, according to one or more embodiments, multiple signals may be analyzed according to the one or more predetermined criteria to determine that a reflection having one or more characteristics corresponds to a reflection from the ground surface 100 (and not the vegetation layer 150). Embodiments of the disclosed subject matter can thus receive multiple reflections and process such reflections to determine whether the reflections correspond to the ground surface 100 or not. Furthermore, the controller 40, based on signals from the distance sensor 30, can set the final width (i.e., stopped from being adjusted) of the cone pattern 250 of the sound waves output from the distance sensor 30 to a width at which the distance sensor 30 can reliably receive reflections from the ground surface 100 and furthermore such reflections can be identified as reflections from the ground surface 100. In this regard, the controller 40 can control the distance sensor 30 to continuously adjust (e.g., reduce) the width of the cone pattern 250 output from the distance sensor 30 until the controller 40 determines that the signals from the distance sensor 30 correspond to reflections from the ground surface 100.

According to one or more embodiments, the initial width of the cone pattern 250 can be a cone pattern set for a ground surface not covered by vegetation. Alternatively, the initial width of the cone pattern 250 can be a previously set width set from a work surface partially or fully covered with a vegetation layer and previously processed by the cold planer 10. Thus, the width of the cone pattern 250 can be adjusted from different starting points depending upon previous settings of the cold planer 10 from a previous cutting operation and/or ground surface. Moreover, in some embodiments the width of the cone pattern 250 can automatically revert to an initial cone pattern width for non-vegetation covered ground surfaces upon the completion of cutting operations of the cold planer 10 (e.g., per cutting pass, cutting segment, or entire cutting project). Alternatively, the width of the cone pattern 250 may remain at a most recently set width from an immediately previous cutting operation of the cold planer 10.

Optionally, prior to the tuning or calibration of the distance sensor 30, the initial width of the cone pattern 250 can be set (e.g., by an operator via the interface device 28, for instance) to an initial width for a vegetation layer when the overlaying vegetation layer 150 on the ground surface 100 is apparent. Such initial width of the cone pattern 250 for the ground surface 100 having the vegetation layer 150 can be relatively more narrow than the initial width of the cone pattern 250 for the ground surface 100 without the vegetation layer 150. Thus, embodiments of the disclosed subject matter can be tuned or calibrated relatively more quickly starting from the initial width of the cone pattern 250 initially set to the initial width specific for vegetation layers (or the like) to the final width of the cone pattern 250 as compared to when starting from the initial width of the cone pattern for ground surfaces without vegetation layers.

According to one or more embodiments, the initial width of the cone pattern 250 can be set using a so-called coarse width setting, for instance, set by the operator using the interface device 28, then the controller 40, in combination with feedback from the distance sensor 30, can fine tune the width of the cone pattern 250 output from the distance sensor 30 to reach and be set at the final width as discussed above. Such initial width setting at the coarse width setting stage may constitute the initial width for the subsequent final tuning stage. Optionally, the fine tuning can include manual tuning by the operator using the interface device 28, even after the automatic tuning has been completed.

According to one or more embodiments, the cold planer 10 can be stationary for the setting of the width of the cone pattern 250 of the distance sensor 30. Additionally or alternatively, such setting can be performed when the cold planer 10 is traveling at a predetermined speed or less. The adjustment of the width of the cone pattern 250 of the distance sensor 30 can be performed periodically or continuously as the cold planer 10 is traveling at the predetermined speed or less. Such adjustment may be referred to or characterized as rolling tuning. As noted above, the adjustment of the width of the cone pattern 250 can be performed starting from the final width of a previously performed adjustment cycle from initial to final width.

Once the width of the cone pattern 250 for the sound waves output by the distance sensor 30 is set at the final width to receive sound wave reflections from the ground surface 100, control operations can be performed, using the controller 40 and/or the processor 36 of the distance sensor 30, to filter some or all of the signals not corresponding to reflections from the ground surface 100 (e.g., signals of lesser strength(s)). Here, the sensitivity of the distance sensor 30 can be adjusted to filter the echoes based on their respective strengths (e.g., amplitudes), focusing primarily or entirely on the signals corresponding to the reflections from the ground surface 100. Thus, embodiments of the disclosed subject matter can effectively tune out noise created by the vegetation layer 150 in favor of signals from the underlying ground surface 100. Though embodiments of the disclosed subject matter are described above as the controller 40 determining whether reflected sound waves received by the distance sensor 30 correspond to the ground surface 100, embodiments of the disclosed subject matter are not so limited, and the distance sensor 30 itself, particularly the processor 36 thereof, can make the determination.

Once the width of the cone pattern 250 for the sound waves output by the distance sensor 30 is set (or all of the cone pattern widths are set for multiple distance sensors 30), a distance from each of the one or more distance sensors 30 to the ground surface 100 can be determined, for instance, by the controller 40 and/or the distance sensor 30. Such distance determination can be performed using reflected signals sensed by the distance sensor 30 that are previously determined to correspond to reflections from the ground surface 100 as discussed above. Here, the distance can be determined by the controller 40 and/or the distance sensor 30 because the time of flight for the distance sensor 30 to receive signals output therefrom corresponding to the ground surface 100 is known and can be used to calculate the distance based on this information. That is, because the ground surface 100 gives a stronger signal the controller 40 and/or the distance sensor 30 can read a stronger amplitude or voltage from the ground surface 100 and the controller 40 and/or the distance sensor 30 know(s) the time it takes for output signals to return to the distance sensor 30, the controller 40 and/or the distance sensor 30 can calculate the distance from the distance sensor 30 to the ground surface 100.

According to one or more embodiments, the determined distance from ground surface 100 to each of multiple distance sensors 30 may vary somewhat. Thus, according to embodiments of the disclosed subject matter, the controller 40 can calculate an average distance to the ground surface 100 based on the distance determinations for all of the distance sensors 30.

The distance determination (or determinations) can be used as a reference point (or points) to the ground surface 150 for the cold planer 10, for example, prior to the cold planer 10 performing a cutting operation on at least that particular portion of the ground surface 100 still having the vegetation layer 150. Such reference point (or points) can be used to set or adjust operating parameters of the cold planer 10. For instance, based on the distance (or distances) from the one or more distance sensors 30, the controller 40 can set, as operating parameter(s), one or more operating heights of the cold planer 10. Such operating heights can be or include the height of the cold planer 10 itself via adjustment of one or more of the actuators 20 and/or an operating height of one or more portions of the cutting system, such as a cutting height of the cutting tool 12 to cut into the ground surface 100 having the overlying vegetation layer 150. Such processing can thus involve determining distances for the height of the cold planer 10 and/or the cutting system based on the determination of the distance(s) from the one or more distance sensors 30 to the ground surface 100 having the overlaying vegetation layer 150.

Additionally or alternatively, the initial distance determination as described above and/or one or more subsequent distance determinations can be used for further operations of the cold planer 10 prior to a working operation of the cold planer 10 (e.g., a cutting operation), during the working operation of the cold planer 10, and/or at the end of the working operation of the cold planer 10. For instance, the distance determinations can be used in features (e.g., software features) used to automate the control of frame 14 distance to the ground and cutting tool 12 depth in/out of the ground.

Optionally, the controller 40 can use distance data obtained from signals from the distance sensor(s) 30 to create a virtual ground plane. The virtual ground plane, combined with other measurement systems on the cold planer 10, for example, a position sensing cylinder used to raise/lower the rotor, can create a very accurate depth of cut. Alternately a virtual ground line between distance sensors 30 can be determined by the controller 40 based on distance information calculated from distance data obtained from signals from the distance sensor(s) 30.

According to one or more embodiments, the process of determining distance from the distance sensor(s) 30 to the ground surface 100 can be performed when the cold planer 10 is stationary and/or as the cold planer 10 moves along the ground surface 100. As an example, the cold planer 10 may be moving from 10-100 ft/min. (inclusive) or below 12 km/hr. In terms of stationary, the process of determining distance from the distance sensor(s) 30 to the ground surface 100 (including the preceding distance sensor adjustment) can be performed as part of an initial setup operation of the cold planer 10, for instance, a setting scratch operation.

Embodiments of the disclosed subject matter, therefore, can continuously or periodically obtain distance measurements to the ground surface 100 with the vegetation layer 150 and adjust the height(s) of the cold planer 10 and/or cutting system accordingly. In this regard, the operating height(s) of the cold planer 10 or portions thereof can be adjusted, in real time, for instance, continuously or periodically, based on the frequency of the distance determinations.

Here even, the adjustment and/or the distance determinations can be performed continuously, however, the adjustment (i.e., setting again) of the machine operating parameters such as one or more operating heights of the cold planer 10 and/or the cutting system may only be performed periodically. That is, the operating heights of one or more systems of the cold planer 10 and/or cutting system may be rely upon the distance to the ground surface 100 determinations only periodically. In this regard, the distance determinations may for the basis for a rolling average distance amount per distance sensor 30.

According to one or more embodiments, data corresponding to the distance to ground surface 100 determinations can be sent, via the wireless communication interface 42, for instance, to one or more other cold planers 10 at the worksite that may not be configured to detect the ground surface 100 through the vegetation layer 150. One or more heights of the one or more other cold planers 10 can thus be set even if such cold planer(s) 10 are not able to detect the ground surface 100 through the vegetation layer 150.

INDUSTRIAL APPLICABILITY

As noted above, embodiments of the disclosed subject matter relate to systems, apparatuses, and methods for determining distance to a ground surface covered with vegetation.

First, it is noted that there can be value in knowing the position of a frame (or other component) of a working machine relative to the ground surface. Such determined distance (or distances) from the frame to the ground surface, which may be referred to or characterized as a reference distance, can be used to set one or more operating parameters of the working machine, such as an operating height of the working machine and/or an operating height (or heights) of a cutting system of the working machine.

In this regard, operators and/or the working machine may need to accurately measure the distance to the ground surface to ensure that the cutting is performed at the correct depth. However, the vegetation may cause interference with signals from a distance sensor (or distance sensors) trying to reach the ground surface. Such interference may lead to inaccurate distance measurements for the ground surface or even an inability to obtain a ground surface distance measurement.

Accordingly, embodiments of the disclosed subject matter can involve a sonic/ultrasonic sensor for measuring distance from a reference point on a work machine (e.g., road milling, road reclamation) to a ground surface. The sensor, or components operatively coupled thereto (e.g., controller 40), can be configured to measure the distance to the ground surface even in the presence of vegetation on the ground, which may cause interference. The sensor can include a sensor sound cone, which can be adjusted to minimize interference from unwanted reflections. The sensor can be configured to provide the tuned distance measurement to a machine control system, which can use the distance measurement in one or more control algorithm(s) and/or an operator interface, for setting and controlling working operations of the working machine, such as a cutting operation of the working machine.

The sensor sensitivity can be adjusted to filter incoming echoes by the amplitude of unwanted reflections and to read the maximum amplitude. As a result, the sensor can provide an accurate, tuned distance measurement to a machine control system, which can use the distance measurement in the control algorithm(s) and/or the operator interface.

Figure 5:
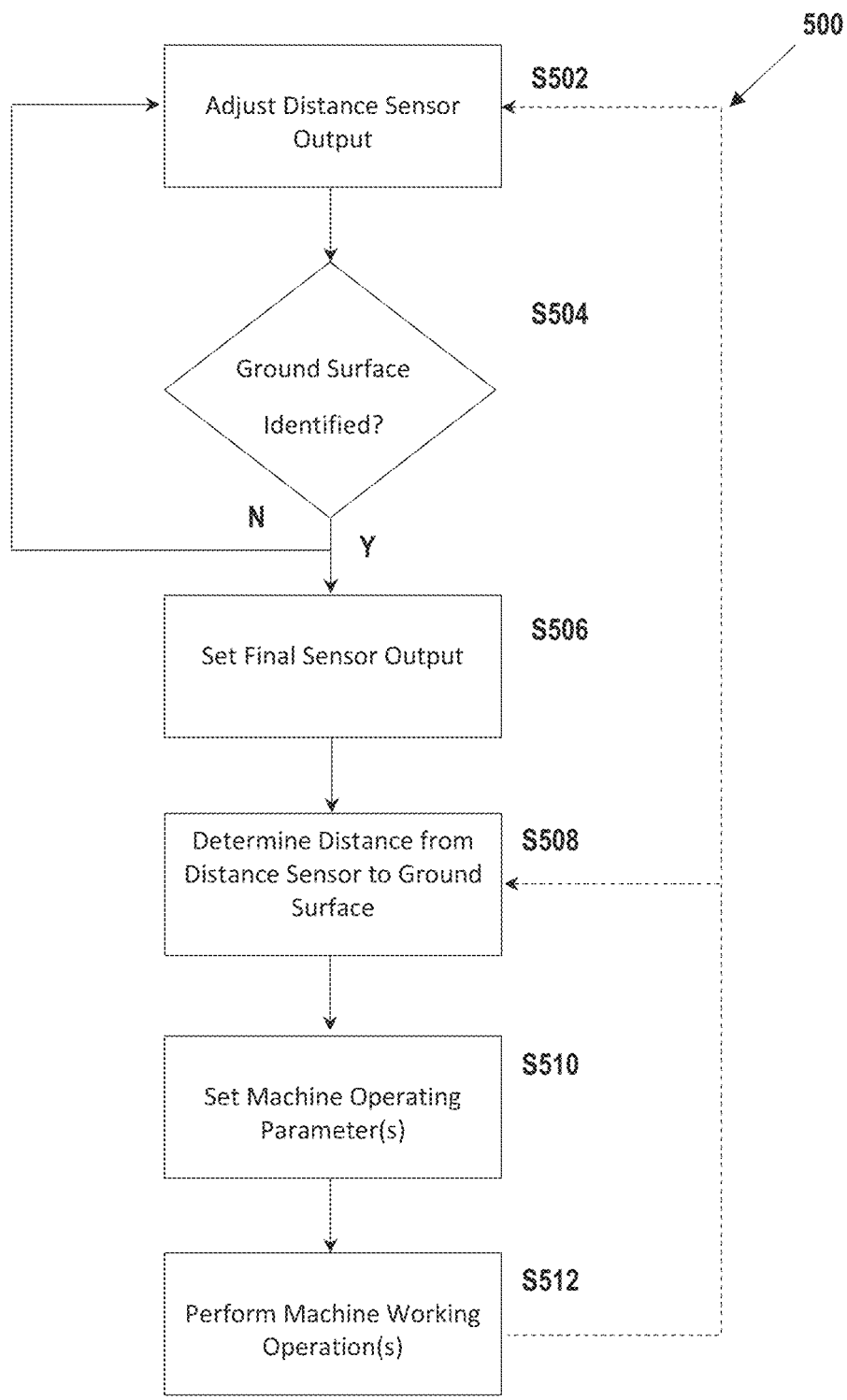
FIG. 5 is flow chart of a control method according to one or more embodiments of the disclosed subject matter.

FIG. 5 is a basic flow chart of a control method 500 according to one or more embodiments of the disclosed subject matter. The control method 500 may be implemented via a non-transitory computer-readable storage medium having stored thereon instructions that, when executed by one or more processors or controllers, cause the one or more processors or controllers to perform the control method 500. The controller 40 discussed above and/or the distance sensor 30 can perform some or all of the operations of the method 500.

Generally, the method 500 can include adjusting an output of each of one or more distance sensors, such as distance sensor 30, at operation S502, as discussed above. The output can be or include the size of the cone pattern output by the distance sensor 30, such as cone pattern 250. The initial size of the cone pattern 250 can be an initial size, for instance, an initial width for the cone pattern 250, such as discussed above. The initial width of the cone pattern 250 can be adjusted (e.g., reduced) to a final width for the cone pattern 250 as described herein.

Based on signals generated by the distance sensor 30 as a result of reflected sound waves from the ground surface 100 with the overlying vegetation layer 150, the method 500 can determine when the reflected sound waves correspond to sound waves reflected from the ground surface 100 (and not the vegetation layer 150) at operation S504. The control may return to operation S502 to continue to adjust (e.g., decrease) the size (e.g., width) of the cone pattern 250 of the sound waves output from the distance sensor 30 until the reflections are determined to be from the ground surface 100. The controller 40 and/or the distance sensor 30 can make the determination that the reflections are from the ground surface 100 as described herein. Optionally, operations S502 and S504 can be part of a coarse tuning and fine tuning strategy whereby the initial size of the cone pattern 250 can be set according to the coarse tuning phase and the final size of the cone pattern 250 can be identified according to the fine tuning phase.

At operation S506 the final size (e.g., width) of the cone pattern 250 of the sound waves output from the distance sensor 30 can be set. Optionally, the operation S506 can be part of the aforementioned fine tuning phase.

At operation S508 the method 500 can include determining a distance from the distance sensor 30 to the ground surface 100 based on outputting sound waves at the set final size of the cone pattern 250 from the distance sensor 30 as described above. If multiple distance sensors 30 are involved, then the operation S508 can include determining the distance from each of the distance sensors 30 to the ground surface 100 based on the respective set final sizes of the cone patterns 250 (which may be the same or different) for the distance sensors 30. Thus, rather than estimating the distance to the ground surface 100 the method 500 can determine an actual distance to the ground surface 100.

At operation S510 the method 500 can include setting one or more operating parameters of the working machine (e.g., cold planer 10). Operating parameters according to embodiments of the disclosed subject matter can include a height (or heights) of the frame 14 of the cold planer 10 and/or a height (or heights) of a cutting system of the cold planer 10, for instance, a cutting height of the cutting tool 12 thereof.

At S512 the cold planer 10 can perform working operations with the set parameter(s), for instance, a traversing and cutting operation for the cold planer 10 to perform a cutting operation across the ground surface 100 having the overlaying vegetation layer 150. Optionally, the method 500 can return to S502 continually or periodically, for instance, as the cold planer 10 traverses each pass or upon starting a new pass across the ground surface 100. Alternatively, the control may proceed instead to S508 where the distance to the ground surface 100 can be continually or periodically determined, for instance, as the cold planer 10 traverses each pass or upon starting a new pass across the ground surface 100.

While aspects of the present disclosure have been particularly shown and described with reference to the embodiments above, it will be understood by those skilled in the art that various additional embodiments may be contemplated by the modification of the disclosed machines, assemblies, systems, and methods without departing from the spirit and scope of what is disclosed. Such embodiments should be understood to fall within the scope of the present disclosure as determined based upon the claims and any equivalents thereof.

The invention claimed is:

1. A milling or reclamation machine adapted to operate over a ground surface at least partially covered with a vegetation layer, the machine comprising:

a frame;

a cutting system mounted to the frame, the cutting system including a rotational cutting tool to cut into the ground surface;

a plurality of adjustable-parameter ultrasonic sensors mounted on the machine, each of the adjustable-parameter ultrasonic sensors being configured to output ultrasonic waves in a cone pattern downward toward a portion of the ground surface that is covered with the vegetation layer and receive corresponding echoes of the ultrasonic waves reflected from the portion of the ground surface and the vegetation layer; and a controller operatively coupled to the plurality of adjustable-parameter ultrasonic sensors and the cutting system, wherein the controller is configured to perform closed-loop control, independently for each of the adjustable-parameter ultrasonic sensors, that includes reducing a width of the cone pattern of the ultrasonic waves from an initial width to a final width at which a strongest echo of the received echoes is repeatedly identified according to at least one predetermined criterion by the controller based on analysis of voltage amplitudes corresponding to respective strengths of the received echoes, and determine, for each of the plurality of adjustable-parameter ultrasonic sensors having the width of the cone pattern set to the final width, a distance from the adjustable-parameter ultrasonic sensor to the portion of the ground surface underlying the vegetation layer based on the strongest echoes and not other echoes of lesser strength.

2. The machine according to claim 1, wherein the controller is configured to perform the closed-loop control when the machine is stationary as part of a setting scratch setup operation for the machine performed prior to performing a cutting operation using the cutting system.

3. The machine according to claim 1, wherein the controller is configured to perform the closed-loop control when the machine is moving forward or backward at a speed from 10-100 ft/min inclusive.

4. The machine according to claim 1, herein the at least one predetermined criterion regarding repeatedly identifying the strongest echo includes identification of at least two successive said strongest echoes.

5. The machine according to claim 1, wherein the at least one predetermined criterion regarding repeatedly identifying the strongest echo includes identification of at least two said strongest echoes within a predetermined time period.

6. The machine according to claim 1, wherein the controller is configured to set one or more heights of the machine based on the determined distance for each of the plurality of adjustable-parameter ultrasonic sensors, the one or more heights including a cutting height of the rotational cutting tool to cut into the ground surface.

7. The machine according to claim 1, wherein, for the reducing the width of the cone pattern of the ultrasonic waves from the initial width to the final width, the initial width is based on a previous final width from an immediately prior cutting operation of the milling or reclamation machine.

8. The machine according to claim 1, wherein the repeated identification of the strongest echo includes comparing the voltage amplitudes of the strengths of the received echoes and selecting a largest voltage amplitude as corresponding to the strongest echo.

9. The machine according to claim 1, wherein the controller is configured to determine an average distance based on each said determined distance from the adjustable-parameter ultrasonic sensor to the portion of the ground surface underlying the vegetation layer, and set an operating height of one or more systems of the machine based on the determined average distance.

10. A method regarding a milling or reclamation machine adapted to operate over a ground surface at least partially covered with a vegetation layer, the machine having a sonic sensor to output sonic waves in a cone pattern downward toward a portion of the ground surface that is covered with the vegetation layer and receive corresponding reflections of the sonic waves reflected from the portion of the ground surface and the vegetation layer, the method comprising:

reducing, under control of processing circuitry, a width of the cone pattern of the sonic waves output from the sonic sensor until reflections of the sonic waves sensed by the sonic sensor are determined to be from the ground surface, the determination that the reflected sonic waves are from the ground surface including comparing respective amplitude values associated with the sensed sonic waves and selecting a highest amplitude value as corresponding to the ground surface; and determining, using the processing circuitry, a distance from the sonic sensor to the portion of the ground surface underlying the vegetation layer using the reflections of the sonic waves having the highest amplitude value and not reflections of sonic waves at lower amplitude values.

11. The method according to claim 10, further comprising setting, under control of the processing circuitry, one or more operating heights of the machine based on the determined distance.

12. The method according to claim 10, wherein the amplitude values for said comparing are voltage amplitude values respectively corresponding to amplitude values of the sensed sonic waves.

13. The method according to claim 10, wherein said reducing and said determining are performed when the machine is stationary, and wherein said reducing includes a coarse tuning phase and a fine tuning phase.

14. The method according to claim 10, wherein during said reducing the width of the cone pattern a strength of the sonic waves is constant, and wherein for said reducing the width of the cone pattern the width is reduced from an initial width to a final width without any increase.

15. A non-transitory computer-readable storage medium having stored thereon instructions that, when executed by one or more processors of a milling or reclamation machine, cause the one or more processors to perform a method comprising:

tuning an ultrasonic sensor to filter unwanted reflections from a vegetation layer covering a ground surface in favor of reflections from the ground surface, said tuning including adjusting a width of ultrasonic waves output by the ultrasonic sensor; and determining a distance from the ultrasonic sensor to the ground surface underlying the vegetation layer using the reflections of the ultrasonic waves output from the ultrasonic sensor at the adjusted width.

16. The non-transitory computer-readable storage medium according to claim 15, wherein the method further comprises determining a rolling average distance based on a plurality of the determined distances for the ultrasonic sensor as the machine moves along the ground surface covered with the vegetation layer.

17. The non-transitory computer-readable storage medium according to claim 15, wherein the method further comprises setting one or more operating heights of the machine based on the determined distance, the one or more operating heights including a cutting height of a cutting tool of a cutting system of the machine.

18. The non-transitory computer-readable storage medium according to claim 15, wherein the method further comprises adjusting one or more operating heights of the machine in real time based on the determined distance as the machine moves along the ground surface covered with the vegetation layer.

19. The non-transitory computer-readable storage medium according to claim 15,
   wherein for said adjusting the width of the ultrasonic waves the width is reduced from an initial width to a final width, and
   wherein the initial width is based on a previous final width from prior operation of the milling or reclamation machine.

20. The non-transitory computer-readable storage medium according to claim 15, wherein said adjusting the width of the ultrasonic waves output by the ultrasonic sensor includes only decreasing the width from an initial value to a final value at which to perform said determining the distance without increasing the width.

\* \* \* \* \*